United States Patent
Hellgren et al.

(10) Patent No.: US 6,830,077 B2
(45) Date of Patent: Dec. 14, 2004

(54) METHOD FOR PRODUCING A STRUCTURAL ELEMENT WITH A REINFORCED BEND AND A STRUCTURAL ELEMENT

(75) Inventors: Lars-Olof Hellgren, Trollhattan (SE); Blair Carlson, Trollhattan (SE); Tomas Ågren, Trollhattan (SE)

(73) Assignee: SAAB Automobile AB (SE)

( * ) Notice: Subject to any disclaimer, the term of this patent is extended or adjusted under 35 U.S.C. 154(b) by 5 days.

(21) Appl. No.: 10/312,648

(22) PCT Filed: Jun. 29, 2001

(86) PCT No.: PCT/SE01/01508
§ 371 (c)(1),
(2), (4) Date: Dec. 26, 2002

(87) PCT Pub. No.: WO02/00366
PCT Pub. Date: Jan. 3, 2002

(65) Prior Publication Data
US 2003/0184109 A1 Oct. 2, 2003

(30) Foreign Application Priority Data
Jun. 29, 2000  (SE) .................................. 0002450

(51) Int. Cl.[7] .................................................. F16L 9/00
(52) U.S. Cl. ........................ 138/174; 138/172; 138/177; 138/178; 29/898.09
(58) Field of Search ................................ 138/172, 174, 138/176–178; 29/898.09, 557

(56) References Cited

U.S. PATENT DOCUMENTS

| | | | | | |
|---|---|---|---|---|---|
| 978,597 | A | * | 12/1910 | Kennedy | 239/602 |
| 3,084,429 | A | * | 4/1963 | Prochazka et al. | 29/520 |
| 3,403,703 | A | * | 10/1968 | Reimann | 138/92 |
| 3,993,248 | A | * | 11/1976 | Harmony | 239/107 |
| 4,144,125 | A | * | 3/1979 | Maritsch | 376/277 |
| 4,267,863 | A | * | 5/1981 | Burelle | 138/109 |
| 5,653,495 | A | | 8/1997 | Bovellan et al. | 296/188 |
| 5,787,934 | A | * | 8/1998 | Flueler | 138/172 |
| 6,041,822 | A | * | 3/2000 | Port et al. | 138/39 |
| 6,305,430 | B1 | * | 10/2001 | Ishikawa | 138/174 |

FOREIGN PATENT DOCUMENTS

| | | |
|---|---|---|
| DE | 19833006 | 2/2000 |
| EP | 0893332 | 1/1999 |
| EP | 0895883 | 2/1999 |

* cited by examiner

*Primary Examiner*—Patrick Brinson
(74) *Attorney, Agent, or Firm*—Ostrolenk, Faber, Gerb & Soffen, LLP

(57) ABSTRACT

A profiled element (1) includes a tubular blank (2) which is formed into the desired shape by hydroforming. In conjunction with hydroforming, at least one slot essentially in the longitudinal direction of the blank is made in wall portions (4, 6) on the blank, and a reinforcing element (3) is fixed in each slot. In a suitable embodiment, each reinforcing element is fixed in two opposite slots and extends through a cavity in the blank. The invention relates to on the one hand a profiled element and on the other hand a method of producing the same.

9 Claims, 1 Drawing Sheet

METHOD FOR PRODUCING A STRUCTURAL ELEMENT WITH A REINFORCED BEND AND A STRUCTURAL ELEMENT

TECHNICAL FIELD

The present invention relates to on the one hand a method of producing a profiled element, according to the precharacterizing clause of claim 1, and on the other hand such a profiled element, according to the precharacterizing clause of claim 7.

STATE OF THE ART

In many types of construction, use is made of profiled elements of different types in order to achieve the desired rigidity and strength. Within the automotive industry, for example, it is customary in many situations to construct, for example, suitable tubular profiled elements from bent sheet-metal components which are welded together. However, the manufacture of such profiled elements requires a number of different working operations and is therefore relatively complicated. Another disadvantage is that the spot welding usually used for joining the component parts together limits the possible strength at a certain material thickness, the joints not being continuous along the profiled element. Another disadvantage is relatively great material consumption and thus great weight.

For the purpose of obtaining simpler, lighter and better profiled elements, it is becoming increasingly common to employ hydroforming, which allows great design freedom. Even then, however, problems arise in producing sufficiently rigid profiled elements with as small a material thickness as possible.

THE OBJECT OF THE INVENTION

The object of the invention is to achieve a simple method of producing a profiled element with good rigidity and with low material consumption. Another object is to produce a simple profiled element with good rigidity and low material consumption.

DISCLOSURE OF THE INVENTION

The object of the invention is achieved by on the one hand employing a method having the features indicated in Patent claim 1 and on the other hand producing a profiled element having the features indicated in Patent claim 7.

By virtue of the method and embodiment selected, it is possible to reinforce the profiled element locally by simple means without increasing the wall thickness thereof. In this way, good rigidity of the profiled element is obtained with low overall weight.

Further advantages and features in a solution according to the invention emerge from the description and the other patent claims.

The invention will be described in greater detail below with reference to exemplary embodiments shown in the accompanying drawing.

DESCRIPTION OF EXEMPLARY EMBODIMENTS

FIGS. 1–5 show a profiled element 1 made according to the invention, which is intended, for taking up load, to be capable of forming part of various types of construction, which constructions are not shown in greater detail in this context for the sake of simplification. One possible area of application is as, for example, a windscreen upright in a motor vehicle, but a large number of other areas of application are of course possible, as required and desired. The profiled element 1 shown includes a blank 2 which is suitably, as in this case, tubular and elongate. At a point which is sensitive in terms of taking up load, in this case at a bend, the blank 2 is provided with at least one reinforcing element 3 which can interconnect mutually opposite walls in the blank 2.

Figure 1:
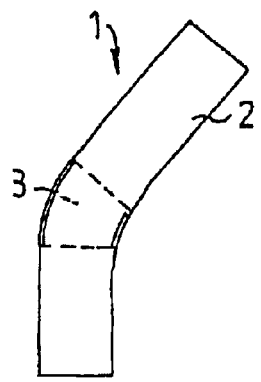
FIG. 1 shows a side view of a profiled element according to the invention.
Figure 2:
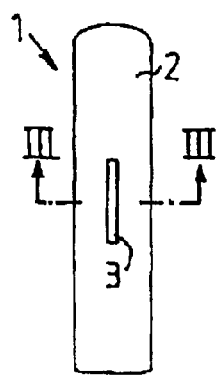
FIG. 2 shows a front view of the profiled element in FIG. 1.
Figure 3:
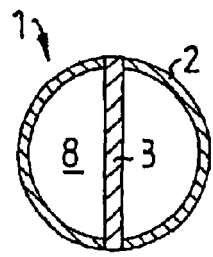
FIG. 3 shows a section III—III in FIG. 2.
Figure 4:
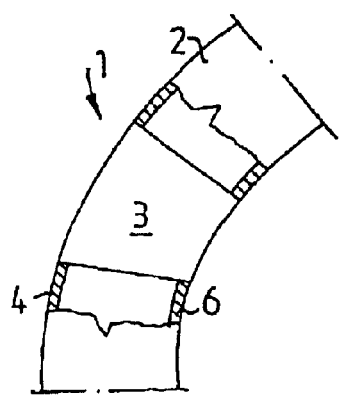
FIG. 4 shows a view partly in section of a portion of the profiled element in FIG. 1.
Figure 5:
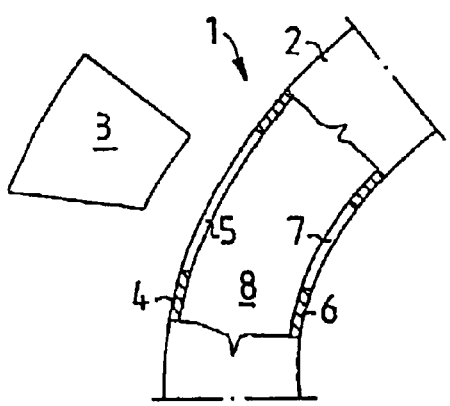
FIG. 5 shows a view corresponding to FIG. 4, but before mounting of a reinforcing element.

The more detailed design of a profiled element 1 at a reinforcing point can be seen from FIGS. 4 and 5. A slot 5, essentially in the longitudinal direction of the blank 2, is made in a first wall portion 4 on the blank 2. In a corresponding manner, a slot 7, which also extends essentially in the longitudinal direction of the blank 2, is made in a second, opposite wall portion 6 on the blank 2. A reinforcing element 3, suitably plate-shaped, is inserted into the two slots 5, 7 and extends through an inner cavity 8 in the blank 2. At the two slots 5, 7, the reinforcing element 3 is joined to the blank 2 and thus rigidifies the latter.

Figure 6:
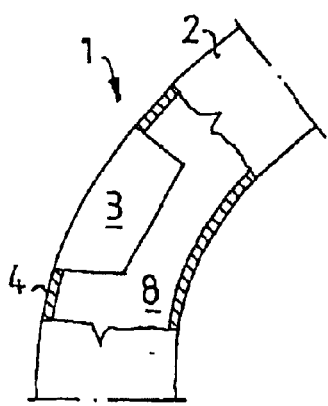
FIG. 6 shows a variant of the embodiment in FIG. 4.

An alternative embodiment is shown in FIG. 6, where only the first wall portion 4 is provided with a slot 5 and where the reinforcing element 3 has a limited extent in the transverse direction of the blank 2. In this connection, the reinforcing element 3 can extend to a greater or lesser extent into the cavity 8, as required and desired.

Figure 7:
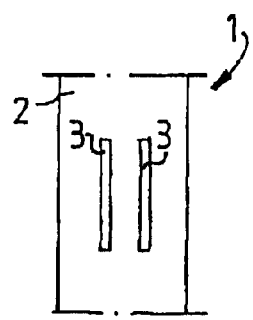
FIG. 7 shows a front view of an embodiment with more than one reinforcing element.

FIG. 7 shows an embodiment with a double set of reinforcing elements 3, in this case positioned at a certain mutual spacing in the lateral direction. These reinforcing elements can then each be mounted either in two opposite slots 5, 7 in the blank, according to FIG. 4, or in a single slot 5, according to FIG. 6.

The number of slots 5, 7 and reinforcing elements 3 and their positioning and design can, over and above what has been shown here, be varied in a number of other different ways within the scope of the invention, as required. For example, it is possible to have both types of reinforcing element 3 shown in FIGS. 4 and 6 in the same profiled element, if appropriate with relative displacement in the longitudinal direction of the blank 2.

Both the blank 2 and the reinforcing element 3 are advantageously made of metal and can be attached to one another in a suitable manner, for example by welding, soldering, adhesive bonding, upsetting or in another way. If appropriate, other materials also can be used, for example plastic of a suitable type.

A particularly advantageous embodiment is obtained if a blank 2 made of metal is used and is given its intended shape by hydroforming. This blank can advantageously be prebent before it is hydroformed. Hydroforming makes it possible to use small wall thicknesses on the finished blank 2 even with a relatively complicated shape, both in the longitudinal direction and in cross section. The rigidity can subsequently be reinforced locally, where such requirements exist, by means of suitably designed reinforcing elements 3. In conjunction with hydroforming, it is expedient to provide a suitable number of suitably designed and positioned slots in the blank 2 in the hydroforming tool itself. This can take place, for example, after the blank itself has been formed.

The reinforcing element 3 can suitably consist of a plate of uniform thickness, if appropriate provided with cutouts to save weight and material. However, it is also possible to make the reinforcing element wedge-shaped, for example, and then to make the reinforcing element 3 thicker at the slot 5 than at the opposite end. In this case as well, use can be made of cutouts in order to save weight and material.

What is claimed is:

1. A method of producing a profiled element comprising forming a tubular blank with a selected shape by hydroforming the blank, and in conjunction with the hydroforming, forming at least one first slot, essentially in the longitudinal direction of the blank, in a first wall portion on the blank, and subsequently inserting a reinforcing element that extends into an inner cavity of the blank into each first slot and fixing the reinforcing element in each first slot.

2. The method according to claim 1, further comprising, also forming at least one second slot, essentially in the longitudinal direction of the blank, in a second wall portion on the blank, wherein the second wall portion is located essentially directly opposite the first wall portion, and the at least one reinforcing element that is inserted into a first slot in the first wall portion is inserted into and fixed in the second slot.

3. The method according to claim 1, wherein the reinforcing element is fixed by welding or soldering.

4. The method according to claim 1, wherein the reinforcing element is fixed by adhesive bonding.

5. The method according to claim 1, wherein the blank is provided with at least two of the reinforcing elements.

6. The method according to claim 1, wherein the slot is formed using the same tool as performs the hydroforming.

7. A profiled element comprising a tubular blank which has been shaped by hydroforming, the blank having a first wall portion, a second wall portion and an inner cavity; at least one first slot in the first wall portion of the blank, the first slot being made in conjunction with the hydroforming of the blank and the first slot extending essentially in a longitudinal direction of the blank, a reinforcing element fixed in the first slot and extending into the inner cavity of the blank;

a second slot extending essentially in the longitudinal direction of the blank, in the second wall portion on the blank, the second wall portion being located essentially directly opposite the first wall portion, and at least one reinforcing element is fixed in a slot in the first wall portion and also fixed in the second slot.

8. A profiled element comprising a tubular blank which has been shaped by hydroforming, the blank having a first wall portion, a second wall portion and an inner cavity; at least one first slot in the first wall portion of the blank, the first slot being made in conjunction with the hydroforming of the blank and the first slot extending essentially in a longitudinal direction of the blank, a reinforcing element fixed in the first slot and extending into the inner cavity of the blank;

the profiled element having a curved portion; the at least one reinforcing element is arranged in the curved portion of the profiled element, and the reinforcing element is located essentially in a plane of curvature of the curved portion.

9. A profiled element according to claim 8, wherein the first and second slots are opposite one another, and the reinforcing element is arranged in the two opposite slots.

* * * * *